United States Patent [19]
Iijima et al.

[11] 3,987,864
[45] Oct. 26, 1976

[54] SAFETY DEVICES FOR MOTOR CARS
[75] Inventors: Tetsuya Iijima, Tokyo; Toshio Shibuya, Yokohama, both of Japan
[73] Assignee: Nissan Motor Co., Ltd., Yokohama, Japan
[22] Filed: July 10, 1974
[21] Appl. No.: 487,022

[30] Foreign Application Priority Data
July 13, 1973 Japan .................. 48-79119

[52] U.S. Cl. .................. 180/82 C; 307/10 SB
[51] Int. Cl.² ........................... B60R 21/10
[58] Field of Search ............. 180/82 C; 340/52 E, 340/278; 307/10 SB

[56] References Cited
UNITED STATES PATENTS

| | | | |
|---|---|---|---|
| 3,718,902 | 2/1973 | Pearsall | 180/82 C |
| 3,740,711 | 6/1973 | Bell | 340/52 E |
| 3,742,448 | 6/1973 | Motz | 180/82 C |
| 3,757,293 | 9/1973 | Petersen | 340/52 E |
| 3,777,180 | 12/1973 | Carlson | 340/52 E |
| 3,831,140 | 8/1974 | Anderson | 307/10 SB |
| 3,860,904 | 1/1975 | Anderson | 307/10 SB |

Primary Examiner—M. H. Wood, Jr.
Assistant Examiner—R. Schrecengost

[57] ABSTRACT

A safety device of a motor car comprises a neutral switch connected in the starting circuit of the engine and arranged to be closed when the speed change gear is in the neutral or parking position, a seat switch closed when the driver sits on the seat, a safety switch closed when the driver wears a safety belt, an interlocking controller responsive to the closure of said three switches for discriminating the sequence of operations thereof, and an interlocking relay connected in the ignition circuit of the engine and controlled by the interlocking controller whereby it is possible to start the engine when the speed change gear is maintained in its neutral or parking position and to operate the engine only when the seat switch and the safety switch are closed at a predetermined sequence while the speed change gear is in its drive position.

3 Claims, 2 Drawing Figures

SAFETY DEVICES FOR MOTOR CARS

BACKGROUND OF THE INVENTION

This invention relates to a safety device for use in motor cars and more particularly to a safety device for motor cars equipped with seat belts or the like safety device.

Although motor cars are generally equipped with safety belts, due to the trouble involved in fastening the belts to the bodies of the users, in many cases they are not used actually. For this reason, it has been proposed a device wherein the driver is rendered impossible to start the engine of the motor car unless he wears the safety belt. With such a device, there is an inconvenience that even when the driver starts the engine for the purpose of inspection or the like purpose, the driver is obliged to wear the seat belt. Actually, it is sufficient to render the driver who does not wear the seat belt to be impossible to start the engine only when the speed change gear of the car is maintained in its drive position. On the other hand, during the running of the car it is very dangerous unless the driver is permitted to operate the engine whether he wears the seat belt or not.

SUMMARY OF THE INVENTION

Accordingly, it is an object of this invention to provide an improved safety device for a motor car according to which whenever the speed change gear of the engine is held in its neutral or parking position, it is possible to start the engine and only when the seat switch and the safety switch are operated in a predetermined sequence it is possible to run the engine when its speed change gear is brought to the drive position.

Another object of this invention is to provide a new and improved safety device for a motor car which enables the driver to operate the engine while the car is running.

Still another object of this invention is to provide a safety device for a motor car which enables the driver to safely inspect the engine.

According to this invention these and further objects can be accomplished by providing a safety device comprising a neutral switch connected in series with the starting circuit of the engine of a motor car and arranged to be closed when the speed change gear of the engine is maintained in the neutral or parking position, a seat switch which is operated when a person sits on the seat of a motor car, a safety switch which is operated when the person wears safety means, an interlocking controller responsive to the signals generated by said three switches for discriminating the operations thereof, and an interlocking relay connected in the ignition circuit of the engine and controlled by the interlocking controller whereby to enable the person to start the engine when the speed change gear is maintained in its neutral or parking position and to enable the person to operate the engine only when the seat switch and the safety switch are operated in a predetermined sequence while the speed change gear is maintained in its drive position.

According to another aspect of this invention the safety device is also provided with a car speed sensor for discriminating the standstill condition and the running condition of the motor car and means for applying the signal generated by the discriminating means to the interlocking controller thereby always enabling a driver to operate the engine while the motor car is running.

BRIEF DESCRIPTION OF THE DRAWING

In the accompanying drawing.

DESCRIPTION OF THE PREFERRED EMBODIMENT

Figure 1:
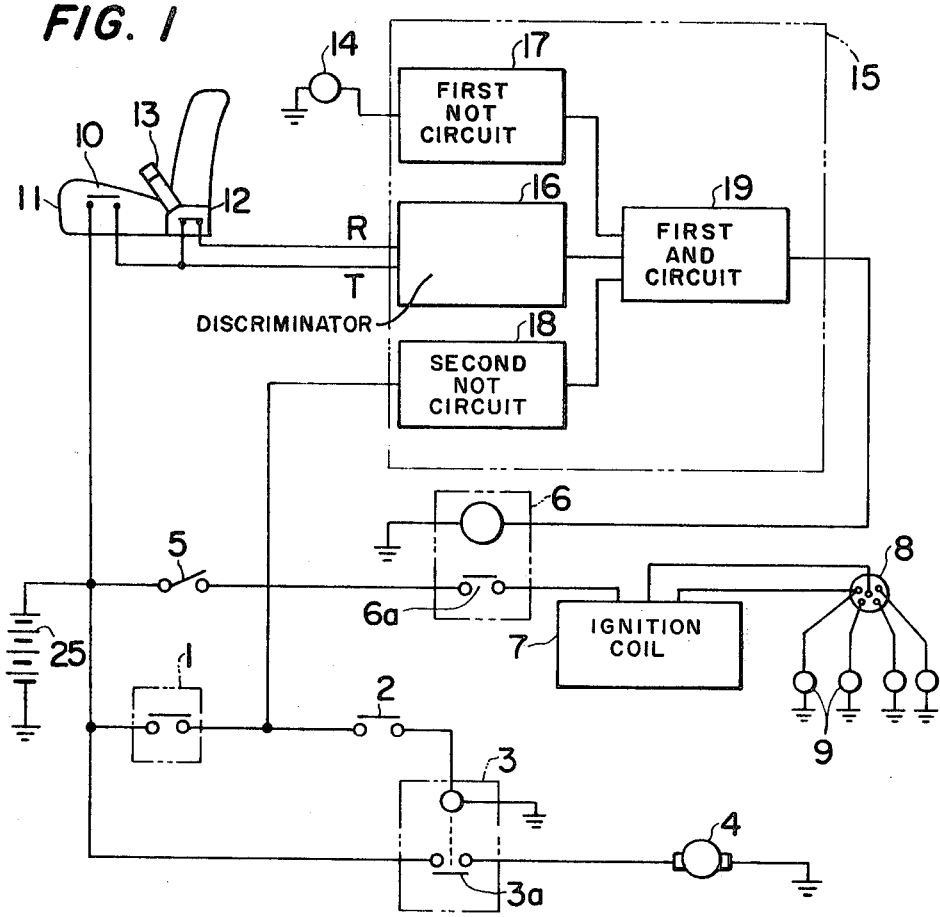
FIG. 1 shows a connection diagram of the safety device embodying the invention.

A preferred embodiment of this invention shown in FIG. 1 comprises a neutral switch 1 which is arranged to be closed when the speed change gear, not shown, of a motor car assumes the neutral position, a start switch 2 and a start relay 3 which are connected in series across a source, a battery 25 for example. A starting motor 4 for an engine, not shown, is connected across the battery 25 via the normal open contact 3a of relay 3. An ignition switch 5, the normal close contact 6a of an interlocking relay 6, and an ignition coil 7, and the rotary contact 8 of a distributor having stationary connected to spark plugs 9 of the engine are also connected in series across the battery 25. A seat 11 of the motor car is provided with a seat switch 10 arranged to be closed by the weight of a driver when he sits on the seat, a seat belt 13, and a normal close safety switch 12 which is arranged to be opened when the driver wears the seat belt 13 or the like safety device provided for the seat. As shown, switches 10 and 12 are connected in series. There is also provided a car speed sensor 14 which is constructed to produce a binary 1 signal when the car is standstill whereas a binary 0 signal during the running of the car. The signals produced by switches 10, 12 and car speed sensor 14 are applied to an interlocking controller 15 to be described hereunder, together with the signal from the neutral switch 1.

The interlocking controller 15 comprises a discriminator 16 connected to receive the signals from switches 10 and 12, an NOT gate circuit 17 connected to receive the output from the car speed sensor 14 and an NOT gate circuit 18 connected to receive the signal from the neutral switch 1. The output from the discriminator 17, and the NOT gate circuits 17 and 18 are applied to the inputs of an AND gate circuit 19 to obtain a logical product thereof, and the output from the AND gate circuit 19 is applied to the interlocking relay 6.

Figure 2:
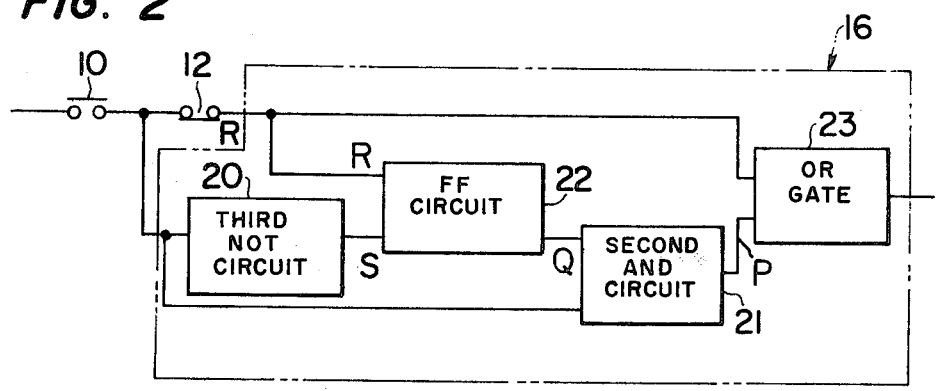
FIG. 2 shows a detail of the discriminator utilized in the safety device shown in FIG. 1.

As shown in detail in FIG. 2, the discriminator 16 comprises an NOT gate circuit 20 and an AND gate circuit 21 which are connected to receive a signal from switch 10, a flip-flop circuit 22 and an OR gate circuit 23 which are connected to receive a signal from switch 12. The output or the NOT gate circuit 20 is applied to the set terminal S of the flip-flop circuit 22 and the output signgal Q thereof is applied to one input of the AND gate circuit 21. The output signal P from the AND gate circuit 21 is applied to one input terminal of the OR gate circuit 23.

The set and reset signals R and S and the output signal Q of the flip-flop circuit 22 have the relation as shown in the following table.

| R signal | S signal | Q signal |
| --- | --- | --- |
| 0 | 0 | constant |
| 1 | 0 | 0 |
| 0 | 1 | 1 |

| R signal | S signal | Q signal |
|----------|----------|----------|
| 1 | 1 | indefinite |

When the speed change gear is held at the neutral or parking position, the switch 1 is closed so that when the start switch 2 is closed, the start relay 3 is energized from battery 25 thus energizing the starting motor 4 through its contact 3a, whereby the engine of the motor car is started. Under these conditions, the NOT gate circuit 18 of the interlocking controller 15 produces an output signal 0 so that AND gate circuit 19 produces a 0 output irrespective of the states of the output signals of the discriminator 16 and the NOT gate circuit 17. Under these conditions, the interlocking relay 6 is not energized to hold its contact 6a closed so that whenever the ignition switch 5 is closed the ignition system of the engine operates to start the engine.

The discriminator 16 operates as follows:

1. When the driver does not sit on the seat 11, and hence the seat belt 13 is not used switches 10 and 12 apply 0 signals to the inputs T and R to the discriminator 16. Then, the NOT gate circuit 20 provides an 1 signal to flip-flop circuit 22 causing it to produce an output signal 1 on its output Q. Since 1 and 0 signals are applied to the inputs of AND gate circuit 21, it will provide a 0 signal to the input P of the OR gate signal. In response to 0 signals supplied by switch 12 and AND gate circuit 21, the OR gate circuit 23 produces an output signal 0. Accordingly, the AND gate circuit 19 produces a 0 output signal thus maintaining the contact 6a of the interlocking relay 6 in the closed state.

2. When the driver sits on the seat 11, switch 10 is closed to supply a signal 1. Since the switch 12 is normally closed this 1 signal is also applied to the input R of the discriminator 16. In response to these 1 inputs, the NOT gate circuit 20 applies a 0 signal to the set terminal of the flip-flop circuit 22 thus causing it produce a 0 signal. In response to the 0 signal produced by the flip-flop circuit 22 and the 1 signal from switch 10, AND gate circuit 21 produces a 0 signal. Since 1 signal is applied to input R and 0 signal is applied to input P, the OR gate circuit 23 produces an 1 signal. Under these conditions, when the speed change gear is changed to the "drive" position from the "neutral" or "parking" position, the neutral switch 1 produces an output signal 0. As a result, the NOT gate circuit 18 produces an output signal 1. Since the car is still in the standstill condition, car speed sensor 14 produces an output signal 0 and the NOT gate circuit 17 produces an output 1, so that AND gate circuit 19 produces an output signal 1 whereby the relay 6 is energized to open its contact 6a. Accordingly, the ignition circuit is interrupted to stop the engine.

3. Under the condition of 2 described above, when the driver wears the seat belt 13, the switch 12 is opened thus producing a 0 output signal. Since the flip-flop circuit 22 still produces 0 output signal. 0 signals are applied to both inputs R and P of the OR gate circuit 23 this circuit produces an output signal 0. Under these conditons, the AND gate circuit 19 produces an output signal 0 thus maintaining contact 6a in the closed position whereby the engine can run.

4. Under the condition of 1, when the driver first wears the seat belt 13 without sitting on the seat 11, switch 12 is opened. Then, signals at points R, S, Q and P are all 1. Then, when the driver sits on the seat, switch 10 is closed. Accordingly, an 1 signal is applied to input T whereas 0 signal is applied to input R of the discriminator. In response to this 1 signal the NOT gate circuit 20 applies an 0 output to the set input S of the flip-flop circuit 22. Since 0 signals are applied to both inputs R and S, the flip-flop circuit 22 produces an output signal 1 and in response to both 1 signals applied to its inputs, AND gate circuit 21 produces an 1 output signal. Accordingly, the OR gate circuit 23 produces an 1 output signal. As described above, when the speed change gear is switched to the drive position during standstill, NOT gate circuit 18 also produces an 1 output signal, the AND gate signal produces an output signal 1. Accordingly, the relay 6 is energized to open its contact 6a. Thus, the ignition circuit is interrupted.

During running of the motor car, the car speed sensor 14 produces an 1 output and the NOT gate circuit 17 produces a 0 output so that the AND gate circuit 19 produces an output 0 irrespective of the states of the outputs from the discriminator 16 and the NOT gate circuit 18. For this reason, the relay 6 is not energized so as to maintain the ignition circuit always in the energized condition, thus permitting continuous running of the engine.

Thus, the invention provides a novel safety device for a motor car wherein whenever the speed change gear is held in its neutral or parking position, it is possible to start the engine, and only when the seat switch and the safety switch are operated in a predetermined sequence it is possible to run the engine even when the speed change gear is brought to the drive position. Accordingly, it is not only possible to inspect the engine while it is stopped but also the driver is obliged to wear the safety belt after he has sit on the seat, thus effectively protecting the driver.

Further, in accordance with another aspect of this invention, the signal produced by a car speed sensor which discriminates the standstill and running conditions of the car is applied to the safety device thus enabling to operate the engine while the car is running. Accordingly, the engine will not be stopped by the operation of the safety device thus assuring safety running. While in the embodiment described above, a seat belt was illustrated as the safety device, it will be clear that any type of safety device including a switch, such as 12 can be used in this invention.

What is claimed is:

1. A safety device for a motor car comprising:
   a neutral switch connected in series with the starting circuit of the engine of the motor car and arranged to be closed when the speed change gear of the engine is maintained in the neutral or parking position;
   a seat switch which is operated when a person sits on the seat of the motor car;
   a safety switch which is operated when the person wears safety means;
   connecting means for connecting said seat switch and safety switch with each other in series and for applying a voltage to one end of the series connection;
   a flip-flop circuit having the reset terminal thereof connected to the other end of the series connection and the set terminal thereof connected through a third NOT gate circuit to the joint between said seat and safety switches;

a second AND gate circuit having one input terminal thereof connected to an output terminal of said flip flop circuit and another input terminal thereof connected to said joint between said seat and said safety switch;

an OR gate having one input terminal thereof connected to the other end of the series connection and another input terminal thereof connected to the output terminal of said second AND gate;

a second NOT gate circuit responsive to the condition of said speed change gear;

means for discriminating the stand still condition and the running condition of the motor car;

a first NOT gate circuit responsive to the output of said discriminating means;

a first AND gate circuit connected to provide a logical product of the outputs of said first and second NOT gate circuits and of said OR gate;

supplying means for supplying the output of said first AND gate circuit to said interlocking relay; and an interlocking relay connected in the ignition circuit of said engine and responsive to the output of said first AND gate circuit for enabling the person to start the engine when said speed change gear is maintained in its neutral or parking position and for enabling the person to operate the engine only when the seat switch and said safety switch are operated in a predetermined sequence while said speed change gear is maintained in its drive position.

2. A safety device for a motor car comprising:
a neutral switch for producing a logic 1 signal when the speed change gear of the engine is in the neutral or parking position;
a seat switch is operated when a person sits on the seat of the motor car;
a safety switch which is operated when the person wears safety means;
vehicle speed sensor for producing a logical 1 signal at the running condition of said motor car;
an interlocking controller including a first NOT gate responsive to the vehicle speed sensor, a discriminator responsive to the operating conditions of said seat switch and said safety switch for producing a logic 0 signal when said seat switch and safety switch are operated in a predetermined sequence, a second NOT gate responsive to the output of said neutral switch for producing a logical 0 signal when the gear is maintained in the neutral or parking position, and a first AND gate responsive to the outputs of said first and second NOT gates and said discriminator; and
interlocking means connected in the ignition circuit of said engine and controlled by the output of said first AND gate to interrupt the starting circuit when the first AND gate produces a logical 1 signal.

3. A safety device according to claim 2, in which said discriminator includes:
connecting means for connecting said seat switch and safety switch to each other in series and for applying a voltage to one end of the series connection;
a flip-flop circuit having the reset terminal thereof connected to the other end of the series connection and the set terminal thereof connected through a third NOT circuit to the joint between said seat and safety switches;
a second AND gate having one input terminal thereof connected to an output terminal of said flip-flop circuit and another input terminal thereof connected to said joint between the seat and safety switches; and
an OR gate having one input terminal thereof connected to an output terminal of said flip-flop circuit and another input terminal thereof connected to the output terminal of said second AND gate.

* * * * *